Patented Jan. 5, 1954

2,665,266

UNITED STATES PATENT OFFICE 2,665,266

GLYCIDYL ETHERS OF CONDENSATION PRODUCTS OF CERTAIN AROMATIC HYDROXY COMPOUNDS WITH PHENOLS HAVING UNSATURATED HYDROCARBON SIDE CHAINS

David Wasserman, Irvington, N. J., assignor to The Harvel Corporation, a corporation of New Jersey No Drawing. Application January 29, 1952, Serial No. 268,917

11 Claims. (Cl. 260—46)

This invention relates to novel compositions of matter and to methods and steps in the methods for producing them. In one of its more specific aspects, the invention is directed to novel glycidyl ethers and to polymers thereof and also to methods for producing them.

The novel glycidyl ethers of this invention are the glycidyl ethers of a particular class of organic reaction products, namely those produced by reacting, in the presence of a cationic condensing agent, (A) a phenol having on its nucleus an unsaturated hydrocarbon substituent of 14–28 carbon atoms with said unsaturation due solely to ethylenic linkage which may number one or more, (B) a phenol selected from the group consisting of hydroxy benzene, naphthol, anthranol, and the homologues thereof. The novel compositions of this invention also include such ethers which are polymerized, and one method for accomplishing this purpose is by heating them, which causes thickening or polymerization of said ethers.

Prior to this invention, glycidyl ethers of resorcinol, dihydroxy-diphenyl-propane and also the polymers thereof have been on the market. These particular compositions of the prior art have a saliently disadvantageous characteristic, namely, that they require the employment of relatively expensive ketones and ethylene glycol ethers as solvents in order that solutions thereof might be obtained.

As distinguished from them, one of the unique characteristics of my novel monomeric and polymeric glycidyl ethers resides in the fact that they are highly soluble in the very cheap terpenic and aromatic hydrocarbon solvents such as turpentine, benzene, toluene, xylene and cumene.

Said compositions of this invention are further characterized by being capable of being heat converted to the substantially solid and infusible state, and in general will be found to have been so converted to that state after having been maintained at 350° F. for a period of 16 hours. However, these novel compositions may be heat converted to the solid and infusible state by maintaining them at elevated temperatures ranging from about 200–400° F. for various lengths of time depending upon the temperature employed. A thin film thereof maintained at 300° F. for approximately 5 hours will be converted to a tough, resilient resinous film. Maintaining said resinous film at 300° F. for an additional period of time of approximately 12 hours will result in the resinous film becoming harder. At the end of that period, it is a much harder film yet it is not brittle but extremely tough. When the curing process is carried out on an aluminum or tin-plate base, it will be found at the end of the entire 17 hour period to have remarkable adhesion characteristics to the surfaces thereof.

While said novel compositions of this invention may be cured at said elevated temperatures without the use of any additive, curing may be accelerated by first adding thereto a small proportion of an amine, illustrative examples of which are: tri(dimethylaminomethyl) phenol, diethylene triamine, triethylene tetramine, dimethylaminopropylamine, dimethylaminomethyl phenol, diethylaminopropylamine, benzyl dimethylamine, piperidine, tri(dimethylaminomethyl) phenol tri(2-ethyl hexoate), diethylamine, pyridine and dicyandiamide. For example, a particular composition of this invention, namely the glycidyl ether of a reaction product, in which cashew nut shell liquid was one of the reactants, was mixed with triethylene tetramine alone or in the presence of suitable solvents, in the ratio by weight of 95 parts of the former to 5 parts of the latter and such a mixture is spread in a thin film and maintained at 25° C. for 17 hours. At the end of that period, it was found to be a hard infusible film. Such a mixture is also spread as a thin film and then maintained at 240° F. for one hour, and at the end of that time was found to be a hard, tough, infusible resinous film.

The compositions of this invention may be cured with polyfunctional acids, examples of which are oxalic, succinic, adipic, azelaic, sebacic, maleic, phthalic, and other dibasic acids and the anhydrides thereof. Said acids react with the epoxy linkage to create hydroxy esters and cross linking polyesters at elevated temperatures. The baking temperatures preferably employed are in the range of approximately 125–175° C. When such an acid is employed together with any of my novel monomeric or polymeric glycidyl ethers, the glycidyl ether is mixed with the acid in the presence of a mutual solvent such as methyl ethyl ketone and the resultant mass is ordinarily conditioned at 105–115° C. for about 30 minutes to drive off the solvent and provide a thick film, then the film is cured at 150–160° C. for 20 to 60 minutes, whereupon it is converted to the tough, hard, infusible and solvent-resistant film.

The novel monomeric and polymeric glycidyl ethers of this invention may be modified by cooking them at approximately 230–290° C. for varying periods of time with varied amounts of fatty acids such as linseed oil, soya-bean oil, dehydrated castor oil, tung oil, and fish oil fatty acids. Tall oil and rosin fatty acids may also be used for that purpose. These ethers so modified may have cobalt, manganese and lead driers added thereto for air drying purposes.

These novel monomeric and polymeric glycidyl ethers may be employed as plasticizers and are eminently suitable for the plasticization of resins obtained from the glycidyl ethers of resorcinol, catechol, hydroquinone, etc., and may be co-polymerized therewith with the aid of heat alone or by employing heat and an additive such as one of the aforementioned amines and/or dibasic acids.

One of the methods which may be employed for the production of the compositions of this invention is to react epichlorhydrin with an organic reaction product produced by reacting, in the presence of a cationic condensing agent, said (A) a phenol having on its nucleus an unsaturated hydrocarbon substituent of 14–28 carbon atoms and (B) a phenol selected from the group consisting of hydroxy benzene, naphthol, antranol, and the homologues thereof, such as cresol, xylenol, etc. By "cresol" is meant methyl phenol which is available in various isomeric forms and by "xylenol" is meant dimethylphenol which is available in various isomeric forms. Illustrative examples of some of said phenols having such unsaturated hydrocarbon substituent and eminently suitable for use in the preparation of said organic reaction products are cashew nut shell liquid, anacardic acid, cardol, cardanol, marking nut shell liquid, urushiol, as well as any of the liquid polymers thereof, which may be produced in a number of different ways well known to the art, and also including any mixture of two or more of them.

By the term "cashew nut shell liquid," I mean to include raw cashew nut shell liquid, however removed from the cashew nut, and in either the decarboxylated or undecarboxylated state, also the so-called treated cashew nut shell liquid which may be produced in a number of different ways known to the art, by extracting therefrom the mineral and nitrogeneous components normally present in raw cashew nut shell liquid, and also cashew nut shell liquid, either raw or treated, which has been heated to remove 0–10% of the more volatile constituents thereof. Among some of the various cationic condensing agents which may be employed are sulphuric acid, aluminum chloride, zinc chloride, phosphorous oxychloride, phosphoric acid, boron trifluoride, etc.

The starting materials, namely the organic reaction products may be readily and easily produced. In general, a quantity of the hydroxy benzene, naphthol, anthranol or any of their homologues, such as cresol or xylenol or any desired mixture of two or more of them is charged into a reaction vessel. If normally solid and having a melting point no greater than about 60° C. the charge is heated to convert it to the liquid state, and if it has a melting point above about 60° C., I prefer to dissolve it in a non-reactive solvent of higher boiling point. A quantity of the cationic condensing agent ordinarily in the anhydrous state is then added to the liquid charge and the mixture is constantly stirred in order to substantially uniformly dissolve the components with respect to each other. The cationic condensing agent added, in general, measures by weight approximately 3–5% of the weight of the component next to be added thereto. Before any addition of the next component I prefer that the temperature of the mass in the reaction vessel be raised to 60° C., then the component next to be added thereto, namely the phenol having said unsaturated hydrocarbon substituent of 14–28 carbon atoms is now slowly added to said mixture, whereupon an exothermic reaction results. The mass within the reaction vessel is continually stirred throughout this entire process and by the use of any appropriate temperature control device the temperature of the mass, throughout the entire course of the additions of said phenol having said unsaturated hydrocarbon substituent, is maintained at a temperature no greater than 85° C. and usually in the range of 80–85° C. After the last increment of said phenol having said unsaturated hydrocarbon substituent has been added and after the exothermic reaction has subsided, then external heat is applied to the mass to maintain it in the temperature range of 80–85° C. for an additional hour in order to assure complete reaction and for obtaining high yields. The mass is then treated with an alkaline agent, for example, ammonia, sodium hydroxide, etc., in order to neutralize the acidic cationic condensing agent in the mass, whereupon salts are formed and are eliminated in any convenient manner. In general, the quantity of the two reactants charged into the reaction vessel are such that for each mole proportion of said phenol having the unsaturated hydrocarbon substituent there are employed 3–12 moles of the hydroxy benzene, naphthol, anthranol, or their homologues so that the latter is present in excess, and after said neutralization and salt eliminating steps, the excess is removed by vacuum distillation.

The organic reaction product so produced and in the reaction vessel is in the liquid state and is the starting material which is now reacted with epichlorhydrin under alkaline conditions, and under either aqueous or anhydrous conditions, whereby the glycidyl ether of the starting material is produced. In general, an appropriate amount of alkali is added to said organic reaction produce which may be first dissolved in a non-reactive solvent, such as dioxane, in said vessel, and then the epichlorhydrin is added to that mass. The amount of epichlorhydrin may be varied depending upon the desired degree of glycidylation of the free phenolic hydroxy content of said starting material. Generally, the amount of epichlorhydrin employed measures between about .25–1.25 moles of epichlorhydrin per mole of available phenolic hydroxyls in the reaction mass so that the hydrogen atoms of .25% to approximately 100% of the available phenolic hydroxyls in said starting materials are replaced by glycidyl radicals. After the addition of the small amount of alkali, the mass is constantly stirred while maintained at a temperature of 75–85° C. and under these conditions the epichlorhydrin is slowly added thereto, while maintaining the mass within said temperature range throughout the entire addition and for a short period after the last increment of epichlorhydrin has been added. After the last increment of epichlorhydrin has been added, the temperature of the mass may almost immediately thereafter be reduced to room temperature when a high yield of monomeric glycidyl ether of the starting material is desired. However, if high yields of polymers are desired, the mass may be maintained at 80–90° C., whereupon it thickens and polymerization of the ethers takes place. Either before or after thickening the mass may be treated with a small quantity of dilute hydrochloric acid to neutralize the mass, whereupon salts are formed and may be removed in any convenient manner. By employing the foregoing procedure, it is possible to produce said glycidyl ethers of said starting materials and also polymers thereof which may vary from low to very high molecular weight, evidenced by the viscosity thereof up to the solid state.

The following examples are given merely by way of illustrating said specific methods for preparing specific compositions of the invention, all parts being given by weight unless otherwise specifically set forth.

Example 1

860 grams of hydroxy benzene was charged into a reaction vessel. The hydroxy benzene was converted to the liquid state and maintained at a pot temperature of 80–85° C. Into said now liquid hydroxy benzene, there was added 35 grams of boron trifluoride-hydroxy benzene complex (26% boron trifluoride). The mass was constantly stirred and while maintained within said temperature range, there was added thereto at a uniform rate over a one hour period, 215 grams of treated cashew nut shell liquid which had been previously prepared in accordance with the method set forth in the U. S. patent of Solomon Caplan, No. 2,559,594 issued on July 10, 1951. In the course of the cashew nut shell liquid addition over this one hour period, an exothermic reaction took place and by the use of an appropriate cooling means the temperature of the mass was maintained within said temperature range throughout the addition. Subsequently, external heat was applied to maintain the temperature of said mass within said temperature range for another hour. Then there was added thereto 7.5 grams of sodium hydroxide as a 25% aqueous solution to neutralize the boron trifluoride. Salts formed and were removed by filtering the mass through a bed of Celite on a Buchner funnel. The salt free mass was now heated under a vacuum up to a pot temperature of 150° C. at 20 millimeters of mercury pressure, whereby all of the excess hydroxy benzene was removed. The mass was then measured and found to weigh 286 grams, and upon analysis was found to contain a .91 equivalents of hydroxy benzene per mole of the cashew nut shell liquid. This reaction product which is an example of a starting material is hereinafter referred to as product I and is a thick viscous liquid.

180 grams of product I was dissolved in 180 grams of dioxane and placed in a two-liter, three neck flask equipped with stirrer, thermometer and addition funnel. 41 grams of sodium hydroxide was dissolved in 80 grams of water and the solution was added to the solution in the flask resulting in a rise in temperature to 50–55° C. while the stirrer constantly agitated the mixture. While the stirrer is still rotating, the flask was heated to raise the temperature of the mass therein to approximately 85° C. and this condition is maintained by appropriate temperature-control device, as 85 grams of epichlorhydrin was added thereto dropwise over a period of one half hour. After the last increment of epichlorhydrin was added, the temperature of the mass was then increased from 85° C. to approximately 90° C. and the mass was maintained at that temperature for one and one half hours. At the end of that period, a sample was tested for unreacted phenolic hydroxy groups by employing the Gibbs 2,6 dibromoquinoneimide chloride reagent, and this test indicated 11.4% unreacted phenol. The mass was then neutralized with .09 moles of hydrochloric acid as a 10% solution and a total of 2 liters of methyl isobutyl ketone added in parts and distilled off under a vacuum to remove the water. The solution of the reaction mass in the ketone remained overnight to permit the salts to settle. This was then filtered through a bed of Celite filter aid on a Buchner funnel and the solvent removed in vacuo to a pot temperature of 90° C. at 20 millimeters of mercury pressure. The reaction product known as product IE is a viscous, pourable resinous mass which was readily dissolved in toluene to make a 40% solution. This resinous product had an epoxy value which equalled .102 equivalents per 100 grams. Portions of said solution were spread in films on aluminum plates and tin-coated lids, and then these film containing bases were placed in an oven maintained at 340° F. After 5 to 6 hours in the oven, the resultant film was examined and found to have been converted to a tough, resinous film and after 17 hours in that oven said coatings were found to be infusible, tough, hard, brown-black films exhibiting remarkable adhesion to the bases.

Triethylene tetramine will harden the resinous reaction mass product IE at room temperatures when 2–5 parts thereof are added to 95 parts of product IE and this mixture is allowed to stand at room temperature for about 17 hours. A .5–1.0 mil film of said mixture on aluminum plates was allowed to stand for 72 hours at room temperature, and at the end of that period was a substantially tough film which resisted the solvent action of "Skydrol" (polyester hydraulic fluid) when applied thereto for at least one week through cotton pads soaked therewith.

Example 2

The procedure is the same as the one set forth in Example 1 for the preparation of product I, except that the amount of hydroxy benzene employed is 1200 grams, the quantity of boron trifluoride-hydroxy benzene complex is 60 grams and the entire cashew nut shell liquid charge is replaced by 300 grams of vacuum distilled cardanol. The resultant reaction mass after neutralization, removal of salts and excess phenol, is a heavy viscous liquid hereinafter known as product II. Product II is dissolved in one liter of toluene and filtered through a bed of Celite on a Buchner funnel. The toluene was removed in vacuo leaving behind an amber-colored viscous pourable product II.

103 grams of viscous amber-colored product II is dissolved in 200 grams of methyl isobutyl ketone in a two-liter, three-neck flask. While being constantly stirred, there was added to said solution, in dropwise fashion, 24 grams of sodium hydroxide dissolved in water. The temperature of the mass was raised to 75° C. After the last addition of the sodium hydroxide solution and then while being constantly stirred, 51 grams of epichlorhydrin was slowly added thereto in dropwise fashion. Throughout the entire course of the epichlorhydrin addition which took approximately one half hour, the temperature of the mass was controlled and maintained in the range of 75–85° C. After the last increment of epichlorhydrin was added, the temperature of the mass was maintained within said temperature range for an additional 90 minutes for complete reaction and high yield purposes. Then the mass was neutralized with .08 moles of dilute hydrochloric acid in 48 grams of water subsequently removed by boiling, using a Dean and Stark water separator arrangement. Then an additional 100 grams of methyl isobutyl ketone was added to the mass and after cooling to 60° C. the solution was filtered through a one-half inch bed of Celite filter aid on filter paper using a Buchner funnel. A clear amber-colored filtrate solution was obtained and tranferred to a distillation flask and the solvent removed in vacuo. The resultant mass, product IIE, weighed 103.5 grams, had a viscosity of 3.6 centimeters at 130° F. on the Fluidmeter and an epoxy value equal to 0.97 equivalents per 100 grams as shown by the Gibbs test for free phenolic groups. A portion of the resin product IIE was cured at 340° F. After 5 hours at that temperature, it was converted to a rubbery mass which when compared with the resin of Example I after 5 hours at 340° C. did not exhibit the toughness characteristic of the solid resin of Example I, which at the end of that period was hard and tough. After being maintained for 17 hours at 340° F. the resin of this example was found to be a rubbery solid. A portion of the resin, product IIE, was cured by adding 5 parts of triethylene tetramine to 100 parts thereof, and this mixture was maintained at 240° F. for one hour. At the end of that period, it was a solid resilient infusible mass. After two hours at that temperature it was harder, tougher and less pliable.

The glycidyl derivatives produced by the methods of Examples 1 and 2 contain both the monomeric glycidyl ether of the original organic reaction product and also polymers thereof. The proportion of monomers to polymers in the end product may be controlled by controlling the time and temperature of heating after the last increment of epichlorhydrin has been added to the organic reaction mass which is the starting material.

The compositions of this invention are both heat curable and cold setting to the substantially solid and infusible state. Cold setting thereof may be accomplished by adding thereto one of the amines heretofore set forth. They are useful as components for varnishes, enamels, molding compositions, adhesives, protective films, fibers, molded articles, oil-stop compounds and potting compounds.

While I have described in general a specific method which may be employed for the production of the starting materials, namely the organic reaction products produced by reacting, in the presence of a cationic condensing agent (A) a phenol having on its nucleus said unsaturated hydrocarbon substituent of 14–28 carbon atoms, and (B) a phenol such as hydroxy benzene, naphthol, anthranol and their homologues, it is to be understood that such starting materials may be produced by employing the method described in the U. S. Patent 2,317,607 issued to Mortimer T. Harvey on April 27, 1943. It is also to be understood that said (A) phenols having said unsaturated hydrocarbon substituent may be in either the monomeric or polymeric state as reactants for reaction with (B) for the production of the starting materials and said polymers are in the reactive state and are preferably in the pourable or liquid condition.

Having thus described the invention, there is claimed:

1. A novel composition selected from the group consisting of monomeric and polymeric glycidyl ether of an organic reaction product, said organic reaction product produced by reacting, in the presence of a cationic condensing agent, (A) a phenol selected from the group consisting of hydroxybenzene, naphthol, anthranol, and their homologues with (B) a phenol having on its nucleus and unsaturated hydrocarbon substituent of 14 to 28 carbon atoms, said unsaturation due solely to ethylenic linkage.

2. Glycidyl ether of an organic reaction product, said organic reaction product produced by reacting, in the presence of a cationic condensing agent, (A) a phenol selected from the group consisting of hydroxybenzene, naphthol, anthranol, and their homologues with (B) a phenol having on its nucleus an unsaturated hydrocarbon substituent of 14 to 28 carbon atoms, said unsaturation due solely to ethylenic linkage.

3. A polymer of glycidyl ether of an organic reaction product, said organic reaction product produced by reacting, in the presence of a cationic condensing agent, (A) a phenol selected from the group consisting of hydroxybenzene, naphthol, anthranol, and their homologues with (B) a phenol having on its nucleus and unsaturated hydrocarbon substituent of 14 to 28 carbon atoms, said unsaturation due solely to ethylenic linkage.

4. Glycidyl ether of an organic reaction product, said organic reaction product produced by reacting, in the presence of cationic condensing agent, cashew nut shell liquid and a phenol selected from the group consisting of hydroxy benzene, naphthol, anthranol and their homologues.

5. Glycidyl ether of an organic reaction product, said organic reaction product produced by reacting, in the presence of cationic condensing agent, cardanol and a phenol selected from the group consisting of hydroxy benzene, naphthol, anthranol and their homologues.

6. Glycidyl ether of an organic reaction product, said organic reaction product produced by reacting, in the presence of a cationic condensing agent, hydroxybenzene and a phenol having an unsaturated hydrocarbon substituent of 14–28 carbon atoms, said unsaturation due solely to ethylenic linkage.

7. Glycidyl ether of an organic reaction product, said organic reaction product produced by reacting, in the presence of a cationic condensing agent, hydroxybenzene and cashew nut shell liquid.

8. Glycidyl ether of an organic reaction product, said organic reaction product produced by reacting, in the presence of a cationic condensing agent, hydroxybenzene and cardanol.

9. Glycidyl ether of an organic reaction product, said organic reaction product produced by reacting, in the presence of a cationic condensing agent, cresol and cashew nut shell liquid.

10. Glycidyl ether of an organic reaction product, said organic reaction product produced by reacting in the presence of a cationic condensing agent, cresol and cardanol.

11. The method comprising in the presence of an alkaline reagent reacting epichlorhydrin with an organic reaction product, said organic reaction product produced by reacting in the presence of a cationic condensing agent, (A) a phenol selected from the group consisting of hydroxybenzene, naphthol, anthranol, and their homologues with (B) a phenol having on its nucleus an unsaturated hydrocarbon substituent of 14 to 28 carbon atoms, said unsaturation due solely to ethylenic linkage.

DAVID WASSERMAN.

References Cited in the file of this patent

UNITED STATES PATENTS

| Number | Name | Date |
|---|---|---|
| 2,317,607 | Harvey | Apr. 27, 1943 |
| 2,324,483 | Castan | July 20, 1943 |
| 2,444,333 | Castan | June 29, 1948 |
| 2,456,408 | Greenlee | Dec. 14, 1948 |
| 2,592,560 | Greenlee | Apr. 15, 1952 |